US012779697B2

(12) United States Patent
I et al.

(10) Patent No.: US 12,779,697 B2
(45) Date of Patent: Nov. 3, 2026

(54) ROBOT SYSTEM, AND CONTROL METHOD

(71) Applicant: FANUC CORPORATION, Yamanashi (JP)

(72) Inventors: Kouta I, Yamanashi (JP); Yuusuke Oota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 460 days.

(21) Appl. No.: 18/043,490

(22) PCT Filed: Aug. 26, 2021

(86) PCT No.: PCT/JP2021/031375
§ 371 (c)(1),
(2) Date: Feb. 28, 2023

(87) PCT Pub. No.: WO2022/050169
PCT Pub. Date: Mar. 10, 2022

(65) Prior Publication Data

US 2023/0311329 A1 Oct. 5, 2023

(30) Foreign Application Priority Data

Sep. 2, 2020 (JP) ................................ 2020-147223

(51) Int. Cl.
*B25J 9/16* (2006.01)

(52) U.S. Cl.
CPC .................................. *B25J 9/1697* (2013.01)

(58) Field of Classification Search
CPC ..................................................... B25J 9/1697

(Continued)

(56) References Cited

U.S. PATENT DOCUMENTS 6,721,444 B1 * 4/2004 Gu ............................ G06T 7/97
382/218
9,102,055 B1 * 8/2015 Konolige .................. G06T 7/60
(Continued)

FOREIGN PATENT DOCUMENTS

CN 110561437 A 12/2019
CN 111274943 A 6/2020
(Continued)

OTHER PUBLICATIONS

Arpenti et al. RGB-D Recognition and Localization of Cases for Robotic Depalletizing in Supermarkets. IEEE Xplore. https://ieeexplore.ieee.org/document/9158347. Published Aug. 4, 2020. (Year: 2020).*

(Continued)

*Primary Examiner* — Jennifer Mehmood
*Assistant Examiner* — Eric James Shoemaker
(74) *Attorney, Agent, or Firm* — Studebaker Brackett PLLC

(57) ABSTRACT

Provided are a robot system and a control method with which it is possible to highly precisely acquire the thickness of an object. This robot system comprises an imaging unit that is mounted on a robot and that captures a two-dimensional image of an object, an image processing unit that acquires distance information pertaining to the object on the basis of the two-dimensional image, a distance image generation unit that generates a distance image on the basis of the distance information, and a thickness calculation unit that calculates the thickness of the object on the basis of the distance image, the imaging unit capturing the two-dimensional image of the object irrespective of the positional relationship between the side surface of the object and the imaging unit.

4 Claims, 9 Drawing Sheets

(58) Field of Classification Search
USPC .......................................... 386/102; 382/106
See application file for complete search history.

(56) References Cited

U.S. PATENT DOCUMENTS

| | | | | |
|---|---|---|---|---|
| 9,507,995 | B2 * | 11/2016 | Konolige | G06T 7/521 |
| 9,630,320 | B1 | 4/2017 | Konolige et al. | |
| 10,455,212 | B1 | 10/2019 | Konolige et al. | |
| 10,614,585 | B2 * | 4/2020 | Ohara | G06T 7/593 |
| 12,134,191 | B2 * | 11/2024 | I | B25J 13/08 |

FOREIGN PATENT DOCUMENTS

| | | | | | |
|---|---|---|---|---|---|
| CN | 111536895 | A | | 8/2020 | |
| CN | 111609801 | A | * | 9/2020 | |
| EP | 1324268 | B1 | * | 7/2016 | G06T 7/0044 |
| JP | 2005-091003 | A | | 4/2005 | |
| JP | 2010-048579 | A | | 3/2010 | |
| JP | 2010-247959 | A | | 11/2010 | |
| JP | 2010-266202 | A | | 11/2010 | |
| JP | 2012215394 | A | * | 11/2012 | |
| JP | 2019-207152 | A | | 12/2019 | |
| WO | 2019/190054 | A1 | | 10/2019 | |
| WO | 2020/008538 | A1 | | 1/2020 | |

OTHER PUBLICATIONS

Marapane et al. Region-Based Stereo Analysis for Robotic Applications. IEEE Transactions on Systems, Man, and Cybernetics. vol. 19. No. 6. 1989. (Year: 1989).*

International Search Report issued in PCT/JP2021/031375; mailed Oct. 12, 2021.

* cited by examiner

ROBOT SYSTEM, AND CONTROL METHOD

TECHNICAL FIELD

The present invention relates to a robot system and a control method.

BACKGROUND ART

Conventionally, various techniques have been proposed to measure a distance to a workpiece having a three-dimensional shape (for example, see Patent Document 1). A three-dimensional measuring device disclosed in Patent Document 1 includes a shape measuring unit that acquires distance information for each point on a surface of an object existing in an imaging field of view, and an indicator that is arranged to be exposed on a sensor housing and indicates a positional relation between the surface of the object calculated based on the distance information acquired by the shape measuring unit and a reference point in the three-dimensional measuring device.

Patent Document 1: Japanese Unexamined Patent Application, Publication No. 2019-207152

DISCLOSURE OF THE INVENTION

Problems to be Solved by the Invention

When a robot picks up stacked workpieces such as cardboard boxes and loads the workpieces to another location (for example, a pallet), a robot system with the robot needs to accurately acquire a thickness of the workpiece. Therefore, it is desired to acquire the thickness of the workpiece with high accuracy.

Means for Solving the Problems

The present disclosure provides a robot system including: an image capturing unit that captures a two-dimensional image of a workpiece; an image processing unit that acquires distance information of the workpiece based on the two-dimensional image; a distance image generation unit that generates a distance image based on the distance information; and a thickness calculation unit that calculates a thickness of the workpiece based on the distance image, the image capturing unit being configured to capture the two-dimensional image of the workpiece regardless of a positional relation between a side surface of the workpiece and the image capturing unit.

The present disclosure provides a control method of a robot system including: a step of capturing a two-dimensional image of a workpiece; a step of acquiring distance information of the workpiece based on the two-dimensional image; a step of generating a distance image based on the distance information; and a step of calculating a thickness of the workpiece based on the distance image, in which, an image capturing unit configured to capture the two-dimensional image of the workpiece captures the two-dimensional image of the workpiece regardless of a positional relation between a side surface of the workpiece and the image capturing unit.

Effects of the Invention

According to the present invention, it is possible to acquire a thickness of a workpiece with high accuracy.

PREFERRED MODE FOR CARRYING OUT THE INVENTION

Figure 1:
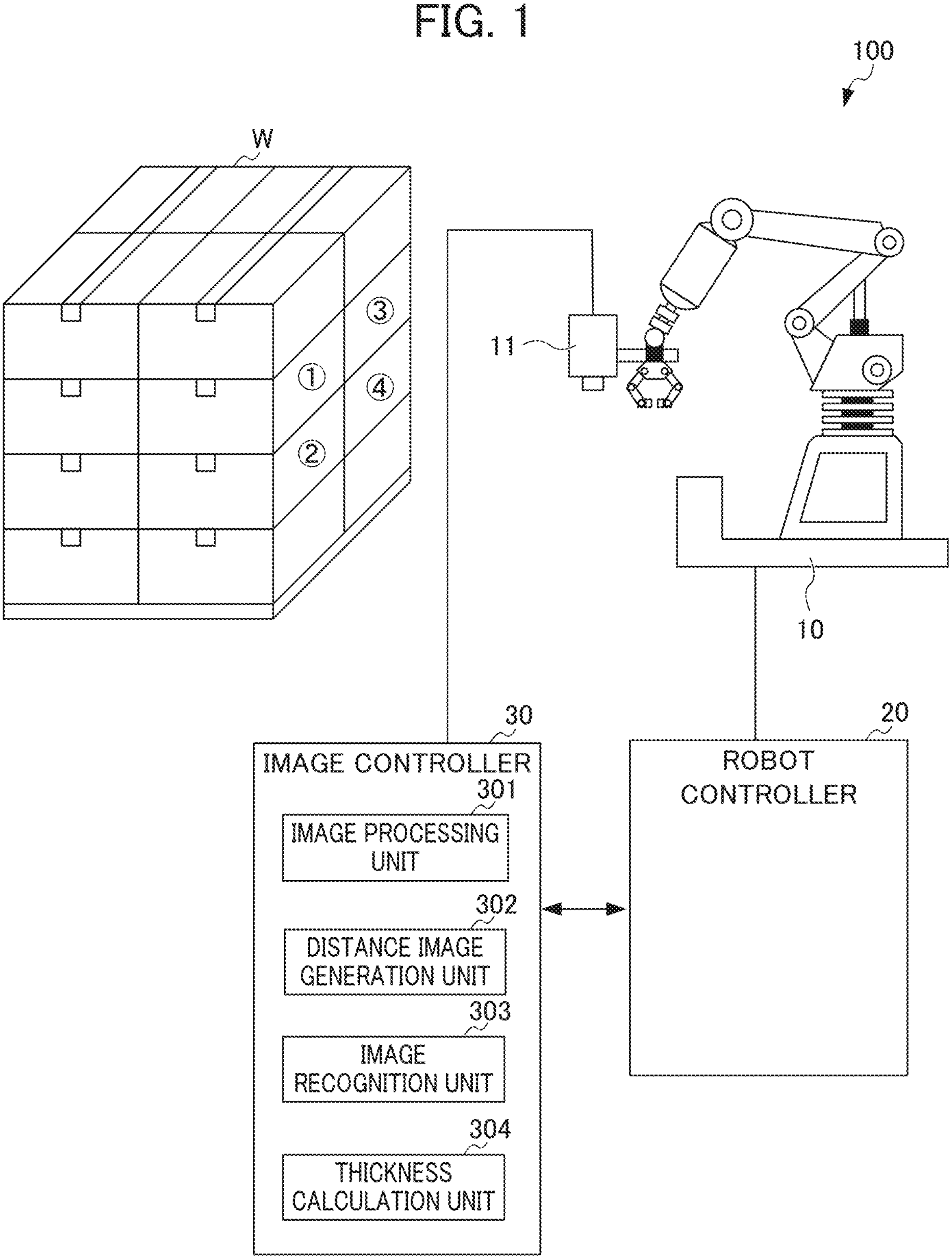
FIG. 1 is a diagram showing an overview of a robot system according to an embodiment.

An example of an embodiment of the present invention will be described below. FIG. 1 is a diagram an overview of a robot system 100 according to the present embodiment. As shown in FIG. 1, the robot system 100 includes a robot 10, an image capturing unit 11, a robot controller 20, and an image controller 30. The robot system 100 performs a task such as handling of a workpiece W with the robot 10 based on an image captured by the image capturing unit 11.

A hand or a tool is attached to a tip of an arm of the robot 10. The robot 10 performs a task such as handling of the workpiece W under control of the robot controller 20. Further, the image capturing unit 11 is mounted on the tip of the arm of the robot 10. The image capturing unit 11 may not be attached to the robot 10, and may be installed at a predetermined position, for example.

The image capturing unit 11 is mounted on the tip of the arm of the robot 10. The image capturing unit 11 captures a distance image and a two-dimensional image of the workpiece W.

Figure 2:
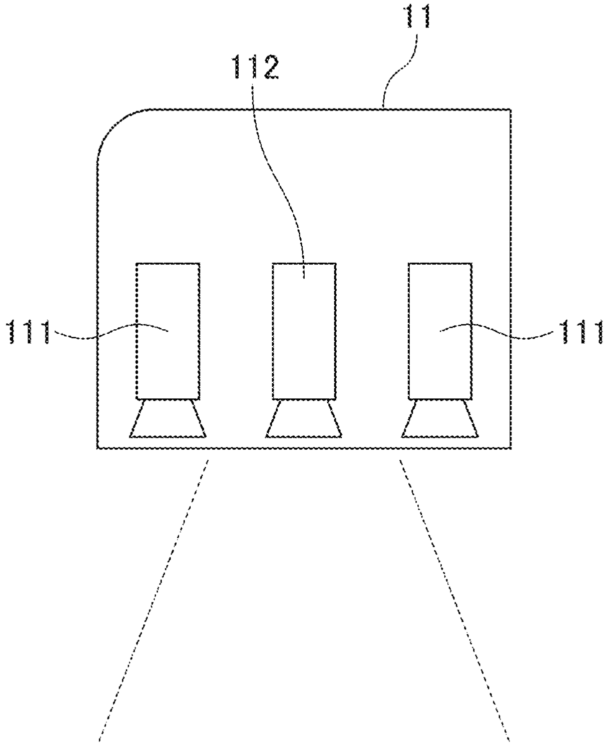
FIG. 2 is a diagram showing a configuration of an image capturing unit.

FIG. 2 is a diagram showing a configuration of the image capturing unit 11. As shown in FIG. 2, the image capturing unit 11 includes an internal camera 111 and a projector 112. The image capturing unit 11 captures a two-dimensional image of the workpiece W. The two-dimensional image is an image configured by gray scales. The internal camera 111 includes two cameras. The internal camera 111 captures an image of the workpiece W (object) irradiated with pattern light such as striped pattern light by the projector 112. In addition, a relative position of the two cameras is determined in advance, and optical axes of the two cameras are arranged to be parallel to each other. The projector 112 functions as a light source, and irradiates the workpiece W with pattern light such as striped pattern light.

Returning to FIG. 1, the robot controller 20 is connected to the robot 10 and controls a motion of the robot 10.

The image controller 30 is connected to the image capturing unit 11 and controls the image capturing unit 11. Further, the image controller 30 performs predetermined processing on the image captured by the image capturing unit 11. Further, the image controller 30 includes an image processing unit 301, a distance image generation unit 302, an image recognition unit 303, and a thickness calculation unit 304.

The image processing unit 301 acquires distance information of the workpiece W based on the two-dimensional image of the workpiece W captured by the image capturing unit 11. The distance image generation unit 302 generates a distance image based on the distance information acquired by the image processing unit 301. The thickness calculation unit 304 calculates a thickness of the workpiece W based on the generated distance image.

Figure 3:
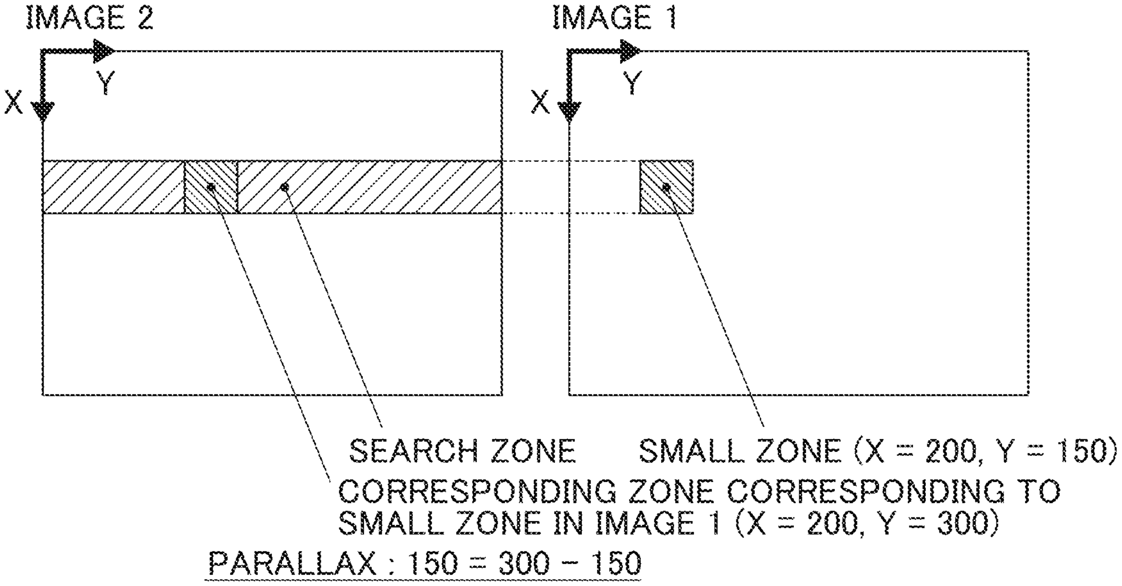
FIG. 3 is a view for explaining processing for obtaining parallax.

FIG. 3 is a view for explaining processing for obtaining parallax. In FIG. 3, images 1 and 2 are two-dimensional images captured by the two internal cameras 111.

The image processing unit 301 searches for an image corresponding to a small zone (image range) in the image 1 from the image 2, and calculates parallax between the image 1 and the image 2.

Such a difference in pixel position between the two images 1 and 2 is called parallax. As a distance from the internal camera 111 to the workpiece W becomes longer, the parallax becomes smaller, whereas as the distance from the internal camera 111 to the workpiece 8 becomes shorter, the parallax becomes larger.

In FIG. 3, for example, a position of the small zone in the image 1 is (X=200, Y=150), a position in the image 2 of a zone corresponding to the small zone in image 1 is (X=200, Y=300), and thus the parallax is 150 (=300−150) for Y. X and Y in FIG. 3 indicate pixels of the internal camera 111.

The image processing unit 301 converts the parallax between the two two-dimensional images into a distance to acquire distance information. The conversion of the parallax into the distance is performed using Formula (1) below.

$$Z=B*F/S \qquad (1)$$

where, Z indicates a distance (mm), B indicates a distance (mm) between two cameras, F indicates a focal distance (mm), and S indicates parallax (mm).

Then, the distance image generation unit 302 generates a distance image using the acquired distance information. In other words, the distance image is obtained by imaging of the distance information between image capturing unit 11 (internal camera 111) to the workpiece W. In the distance image, therefore, a location closer to the image capturing unit 11 becomes brighter on the image, and a location farther from the image capturing unit 11 becomes darker on the image.

Figure 4:
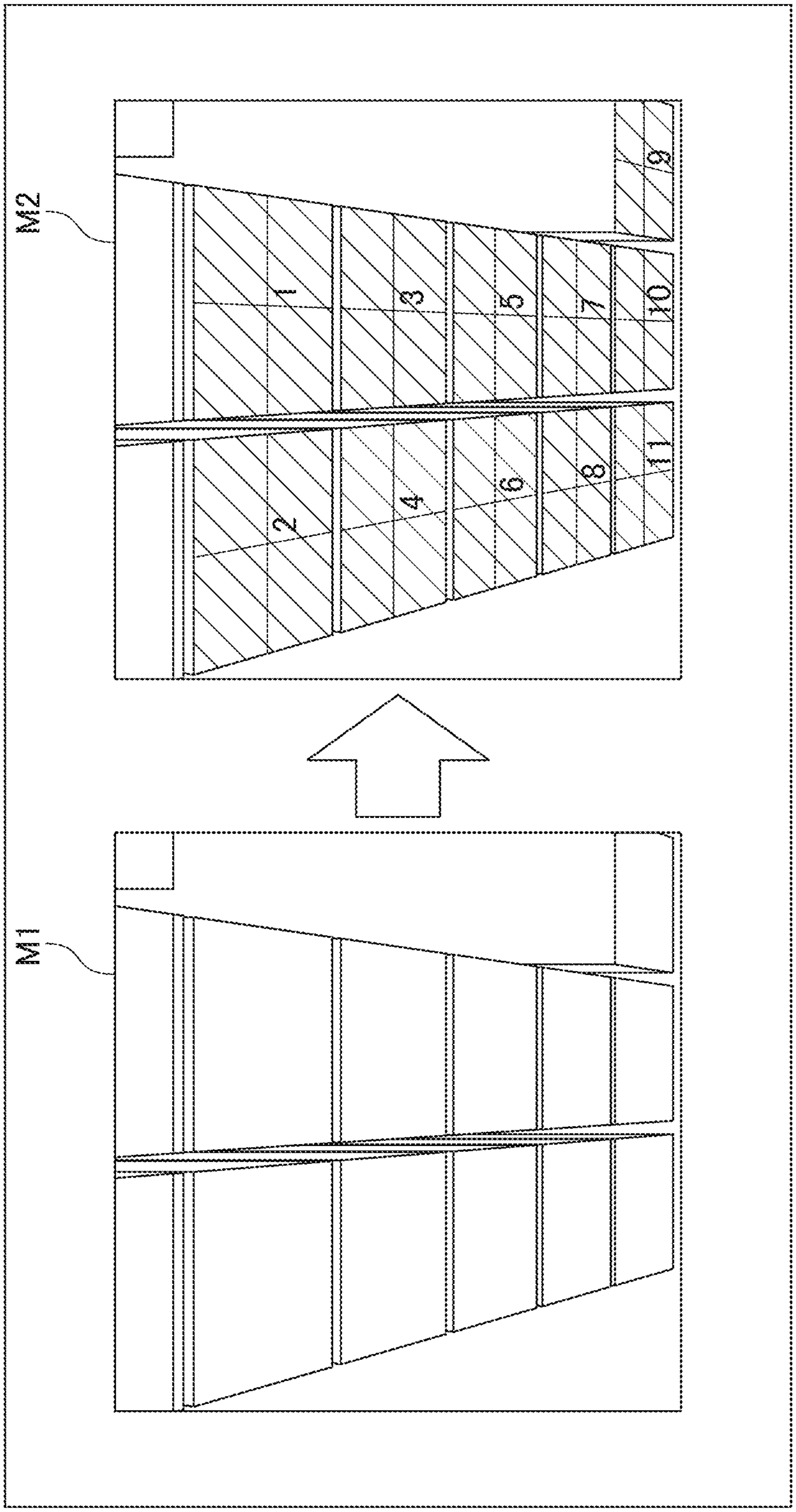
FIG. 4 is a view showing processing for a distance image.
Figure 5:
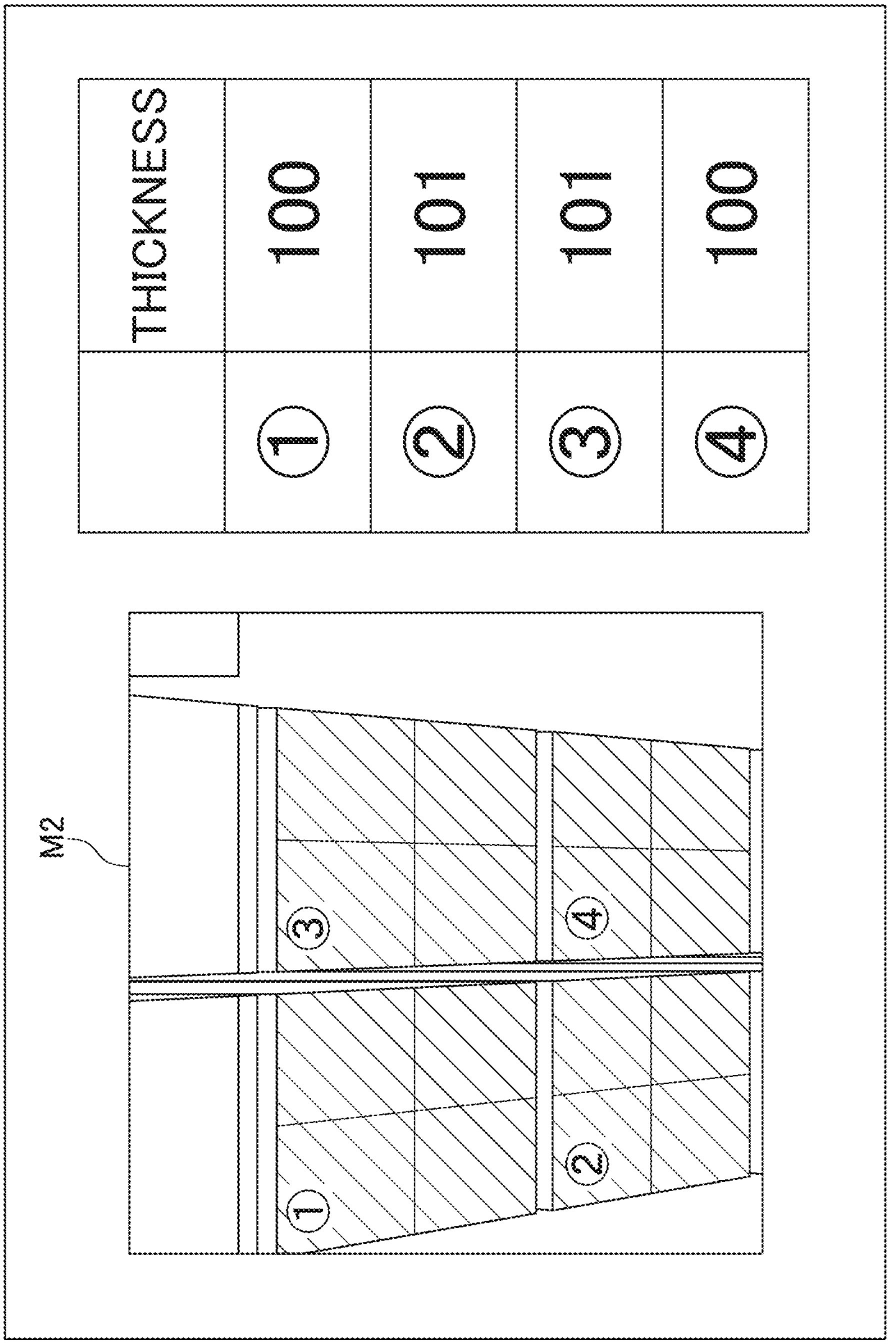
FIG. 5 is a view showing an example of a distance image and a thickness of a workpiece.

FIG. 4 is a view showing processing for a distance image. FIG. 5 is a view showing an example of a distance image and a thickness of the workpiece.

The image recognition unit 303 connects adjacent three-dimensional points in the distance image, and characterizes a set of the three-dimensional points by an area and an angle. The image recognition unit 303 detects the set (blob) of the characterized three-dimensional points to detect the workpiece W. Then, the thickness calculation unit 304 calculates a thickness of the detected workpiece W.

In the example shown in FIG. 4, a search range is set using a major axis and a minor axis of the blob as feature amounts in a distance image M1, and thus eleven workpieces are detected.

Figure 6:
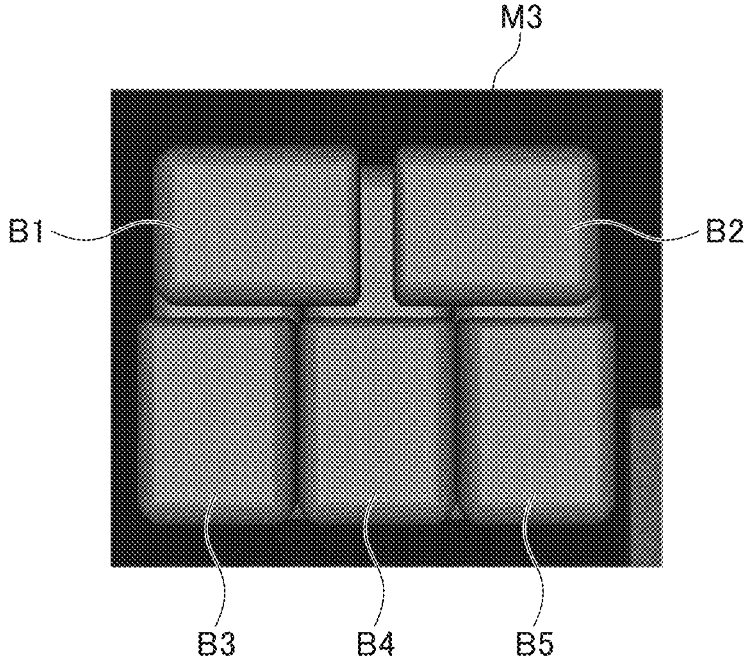
FIG. 6 is a view showing a distance image including five loaded workpieces.
Figure 7:
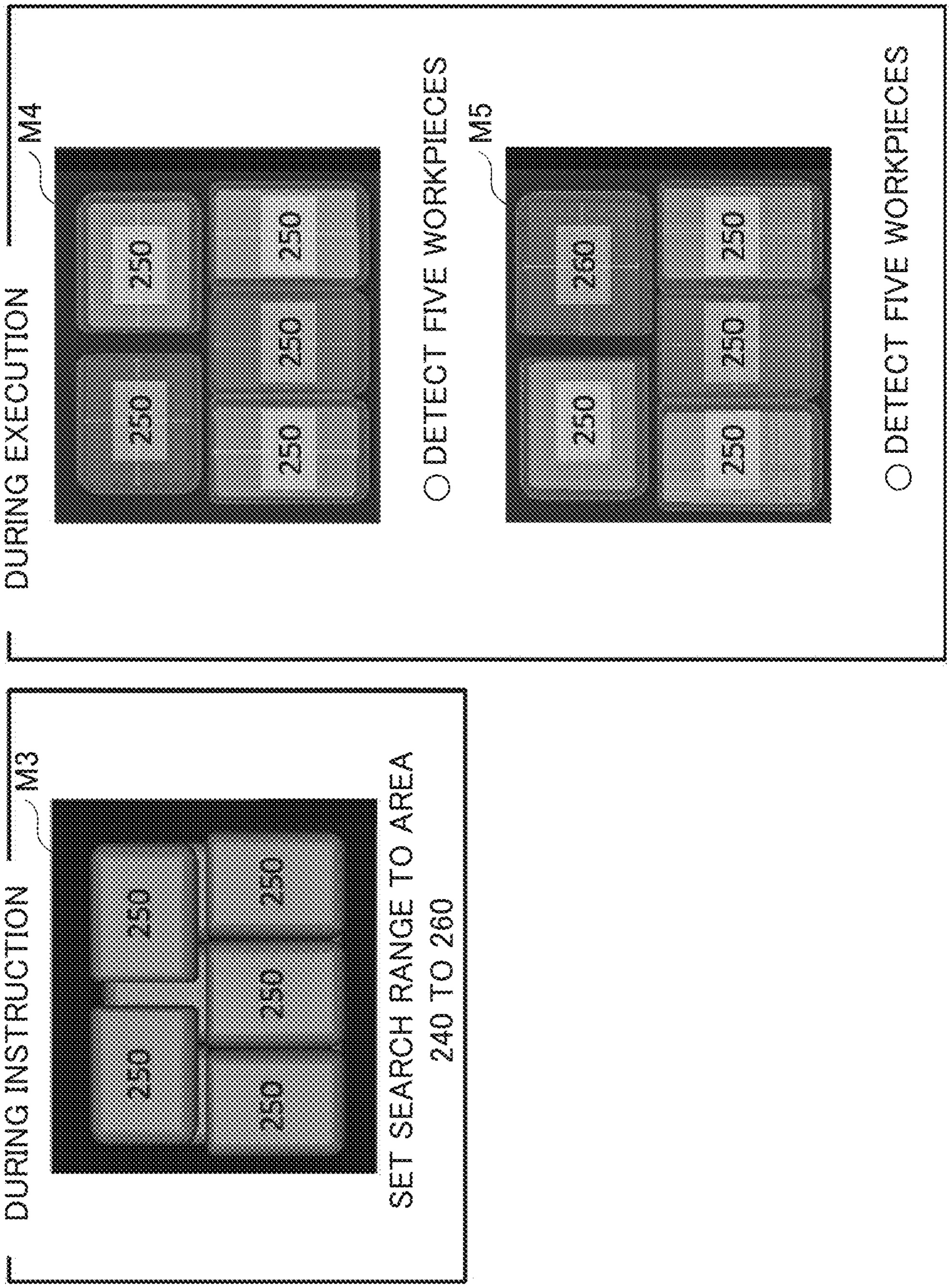
FIG. 7 is a view showing an example of setting an area of a blob of a workpiece as a feature amount and detecting a set feature amount.
Figure 8:
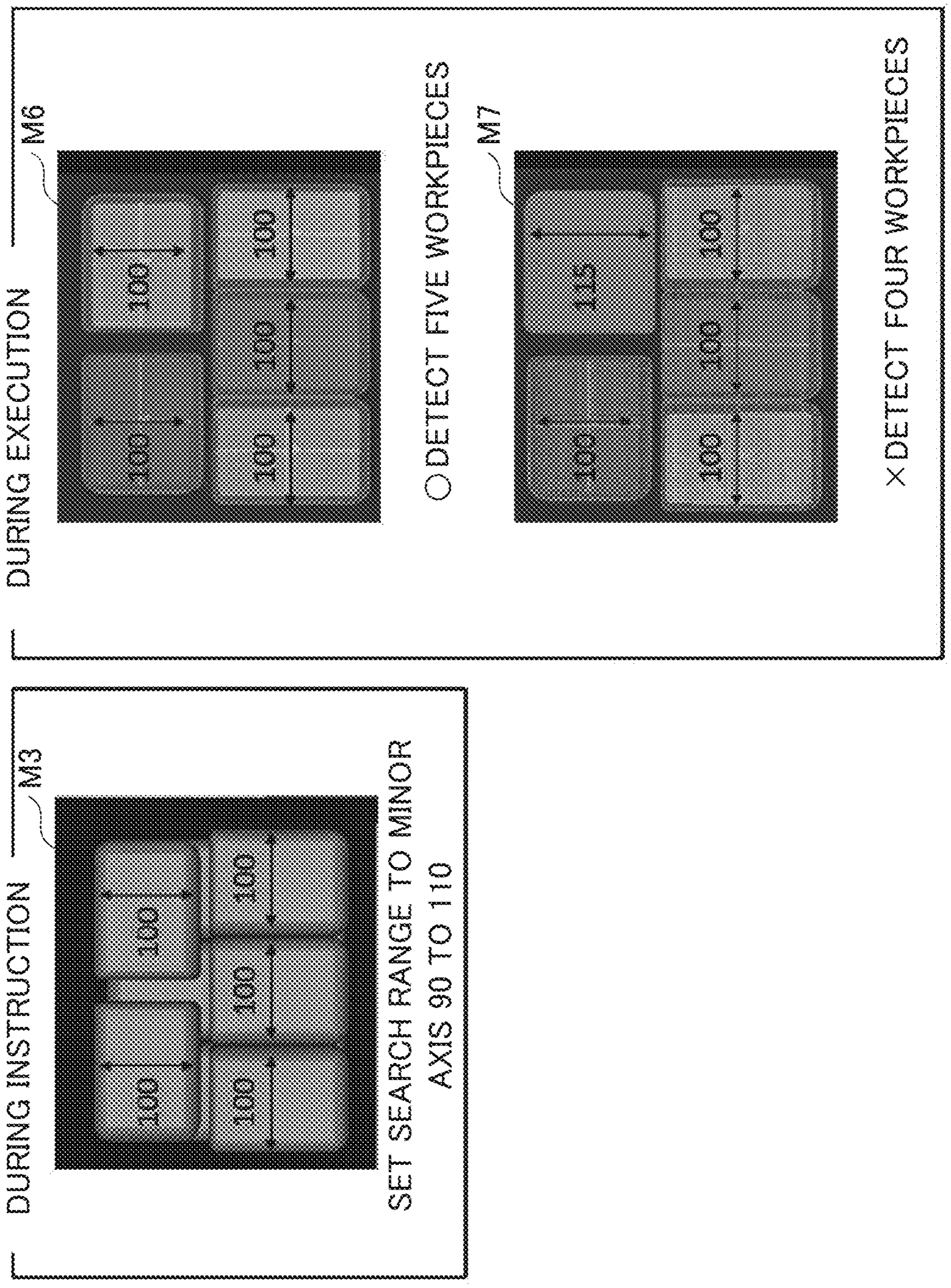
FIG. 8 is a view showing an example of setting a minor axis length of a blob of a workpiece as a feature amount and detecting a set feature amount.

FIGS. 6 to 8 are views for explaining processing for detecting workpieces from a blob. In examples shown in FIGS. 6 to 8, processing for detecting five loaded workpieces B1 to B5 will be described.

FIG. 6 shows a distance image including the five loaded workpieces B1 to B5. First, when an instruction is issued to detect workpieces, the image recognition unit 303 selects one or more feature (for example, a major axis length and a minor axis length) so as to detect all workpieces in response to an operation of an operation unit (not shown) by an instructor, and sets a search range for searching for one or more feature amounts.

The image recognition unit 303 detects blobs existing within the set search range as workpieces. In order to reduce erroneous detection and non-detection, the image recognition unit 303 repeats the detection in response to the operation of the operation unit by the instructor, and thus adjusts the search range for searching for the feature amounts.

FIG. 7 shows an example of setting an area of a blob of a workpiece as a feature amount and detecting the set feature amount. In an example shown in FIG. 7, images M4 and M5 are shown as an example of detecting a workpiece. In the images M4 and M5, since areas of blobs of all workpieces are within the set search range, the image recognition unit 303 can detect all of the workpieces B1 to B5.

FIG. 8 shows an example of setting a minor axis length of a blob of a workpiece as a feature amount and detecting the set feature amount. In an example shown in FIG. 8, images M6 and M7 are shown as an example of detecting a workpiece.

In the image MG, since minor axis lengths of blobs of all workpieces are within the set search range, the image recognition unit 303 can detect all of the workpieces B1 to B5. On the other hand, In the image M7, since a minor axis length of the blob of the workpiece B2 is not within the set search range, the image recognition unit 303 cannot detect the workpiece B2.

When the search range is not appropriate as described above, the image recognition unit 303 generates erroneous detection and non-detection of the workpieces. In the above-described example, the area and the minor axis length of the workpiece are used as the search range for the feature amount to be adjusted, but the feature amount is not limited thereto. The feature amount may be, for example, the major axis length or the angle.

The thickness calculation unit 304 may calculate the thickness of the workpiece W recognized by the image recognition unit 303 before the workpiece W is picked up by the robot 10. In addition, when a plurality of workpieces W are placed on a pallet for loading luggage, the thickness calculation unit 304 may calculate thicknesses of the plurality of workpiece W for each pallet and calculate may calculate an average value of the thicknesses of the plurality of workpieces W, thereby calculating the thickness of the workpiece W.

Further, the thickness calculation unit 304 can calculate the thickness of the workpiece W recognized by the image recognition unit 303, for example, using methods (1) to (4) below.

(1) Using major/minor axis lengths of a blob of the workpiece W.

(2) Using an average value of major/minor axis lengths of a plurality of blobs.

(3) Using a length between centroids of blobs adjacent to each other in a height direction.

(4) Using an average value of lengths between centroids of a plurality of blobs adjacent to each other in a height direction.

With such processing, the thickness calculation unit 304 can calculate the thickness of the workpiece W even when a plurality of cardboard boxes are stacked as the workpiece W as shown in FIG. 5. In FIG. 5, particularly, the thicknesses of the workpiece W are calculated at four locations shown in FIG. 1.

Figure 9:
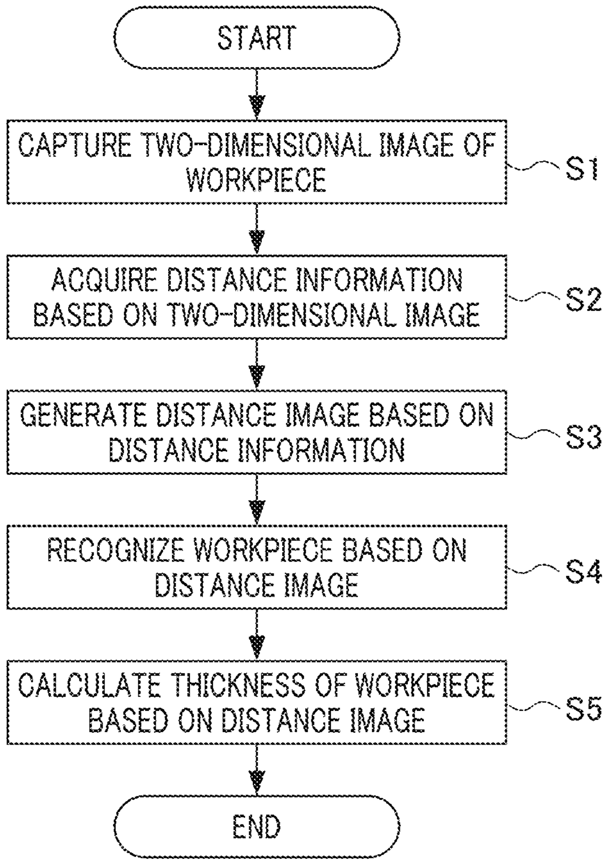
FIG. 9 is a flowchart showing the processing of the robot system.

FIG. 9 is a flowchart showing the processing of the robot system 1. In Step S1, the image capturing unit 11 captures a two-dimensional image of the workpiece W. Here, the image capturing unit 11 moves according to the motion of the robot 10, and captures the two-dimensional image of the workpiece regardless of the positional relation between the side surface of the workpiece W and the image capturing unit 11. In other words, the image capturing unit 11 captures the two-dimensional image of the workpiece regardless of whether the side surface of the workpiece W faces the image capturing unit 11.

in Step S2, the image processing unit 301 acquires distance information of the workpiece W based on the two-dimensional image. In Step S3, the distance image generation unit 302 generates distance image based on the distance information in Step S4, the image recognition unit 303 recognizes the workplace W based on the distance image. In Step S5, the thickness calculation unit 304 calculates a thickness of the workpiece W based on the recognized distance image in which the workpiece W is recognized.

As described above, the robot system 100 according to the present embodiment includes the image capturing unit 11 that captures the two-dimensional image of the workpiece W, the image processing unit 301 that acquires the distance information of the workpiece W based on the two-dimensional image, the distance image generation unit 302 that generates the distance image based on the distance information, and the thickness calculation unit 304 that calculates the thickness of the workpiece W based on the distance image. The image capturing unit 11 moves according to the motion of the robot 10, and captures the two-dimensional image of the workpiece regardless of the positional relation between the side surface of the workpiece W and the image capturing unit 11.

The conventional technique uses a three-dimensional sensor to measure the thickness of the workpiece from a difference between three-dimensional information (for example, height or shape) of a base or a floor as a reference and three-dimension information of the workpiece (for example, loaded luggage). Therefore, the conventional technique can measure the thicknesses of the workpieces only when the workpieces are not stacked. In addition, the conventional technique requires that the three-dimensional sensor faces an upper surface of the workpiece.

On the other hand, since the robot system 100 according to the present embodiment calculates the thickness of the workpiece W based on the distance image, it is possible to acquire the thickness of the workpiece W with high accuracy regardless of whether the side surface of the workpiece W faces the image capturing unit 11. Further, unlike the conventional technique, the robot system 100 can acquire the thickness of the workpieces W even when the workpieces W are stacked. In addition, since the robot system 100 calculates the thickness of the workpiece W based on the distance image, it is not necessary to measure the reference position unlike the conventional technique.

Further, the thickness calculation unit 304 calculates the thickness of the workpiece W by calculating the average value of the thicknesses of the plurality of workpieces W based on the distance image. Thus, the robot system 100 can acquire the thickness of the workpiece W with high accuracy even when the workpieces W (for example, cardboard boxes) having approximately the same shape are loaded.

In addition, the thickness calculation unit 304 connects adjacent three-dimensional points in the distance image, characterizes a set of the three-dimensional points, and detects the set (blob) of three-dimensional points to detect the workpiece W. Thus, the robot system 100 can acquire the thickness of the workpiece W with high accuracy regardless of whether the side surface of the workpiece W faces the image capturing unit 11.

Although the embodiment of the present invention has been described, the robot system 100 can be implemented by hardware, software, or a combination of the hardware and the software. Further, the control method performed by the robot system 100 described above can be implemented by hardware, software, or a combination of hardware and software. Here, the implementation by software means implementation by a computer reading and executing a program.

The program may be stored and supplied to a computer using various types of non-transitory computer readable media. The non-transitory computer-readable media include various types of tangible storage media. Examples of non-transitory computer-readable media include magnetic storage media (for example, hard disk drives), optical magnetic storage media (for example, magneto-optical disks), a CD-Read Only Memory (ROM), CD-R, CD-R/W, and semiconductor memories (such as mask ROM, Programmable ROM (PROM), Erasable PROM (EPROM), flash ROM, RAM (random access memory)).

Moreover, although the above-described embodiment is a preferred embodiment of the present invention, the scope of the present invention is not limited only to the embodiment. Various modifications can be made without departing from the gist of the present invention.

EXPLANATION OF REFERENCE NUMERALS

1 robot system
10 robot
11 image capturing unit
20 robot controller
30 image control unit
301 image processing unit
302 distance image generation unit
303 image recognition unit
304 thickness calculation unit

The invention claimed is:

1. A robot system comprising:
an image capturing unit that captures two two-dimensional images including a first image and a second image of a workpiece;
an image processing unit that acquires distance information of the workpiece based on the two two-dimensional image;
a distance image generation unit that generates a distance image based on the distance information;
an image recognition unit recognizing the workpiece based on the distance image;
a thickness calculation unit that calculates a thickness indicating a vertical dimension of the workpiece recognized by the image recognition unit based on the distance image; and
a robot controller that controls a robot based on the thickness calculated by the thickness calculation unit,
wherein the image capturing unit includes
a first internal camera that captures the first image and
a second internal camera that captures the second image, wherein the image recognition unit detects one or more workpieces from among a plurality of workpieces by selecting one or more feature amounts of a workpiece in response to an operation of an operation unit by an instructor, sets a search range for searching for the one or more feature amounts, and adjusts the search range to search for the feature amounts by feeding back a detection result of the workpiece through repeatedly detecting the plurality of workpieces while sequentially updating the search range, and wherein the image processing unit acquires the distance information by searching the second image for an image corresponding to a small zone in the first image, calculating a parallax between the first image and the second image, and converting the parallax to a distance.

2. The robot system according to claim 1, wherein the workpiece comprises a plurality of workpieces, and the thickness calculation unit calculates an average value of thicknesses of the plurality of workpieces based on the distance image to calculate the thickness of the workpiece.

3. The robot system according to claim 1, wherein the thickness calculation unit connects adjacent three-dimensional points in the distance image, characterizes a set of the three-dimensional points, detects the set of three-dimensional points to detect the workpiece, and calculates a thickness of the detected workpiece.

4. A control method of a robot system, comprising:

a step of capturing two two-dimensional images including a first image and a second image of a workpiece;

a step of acquiring distance information of the workpiece based on the two two-dimensional image;

a step of generating a distance image based on the distance information;

a step of recognizing the workpiece based on the distance image;

a step of calculating a thickness indicating a vertical dimension of the workpiece based on the distance image; and;

a step of controlling a robot based on the calculated thickness, wherein the step of recognizing the workpiece includes:

a step of detecting one or more workpieces from among a plurality of workpieces by selecting one or more feature amounts of a workpiece in response to an operation by an instructor;

a step of setting a search range for searching for the one or more feature amounts; and a step of adjusting the search range to search for the feature amounts by feeding back a detection result of the workpiece through repeatedly detecting the plurality of workpieces while sequentially updating the search range, wherein the step of capturing includes capturing a first image and a second image, and wherein the step of acquiring distance information includes searching the second image for an image corresponding to a small zone in the first image, calculating a parallax between the first image and the second image, and converting the parallax to a distance.

* * * * *